Patented Mar. 13, 1951

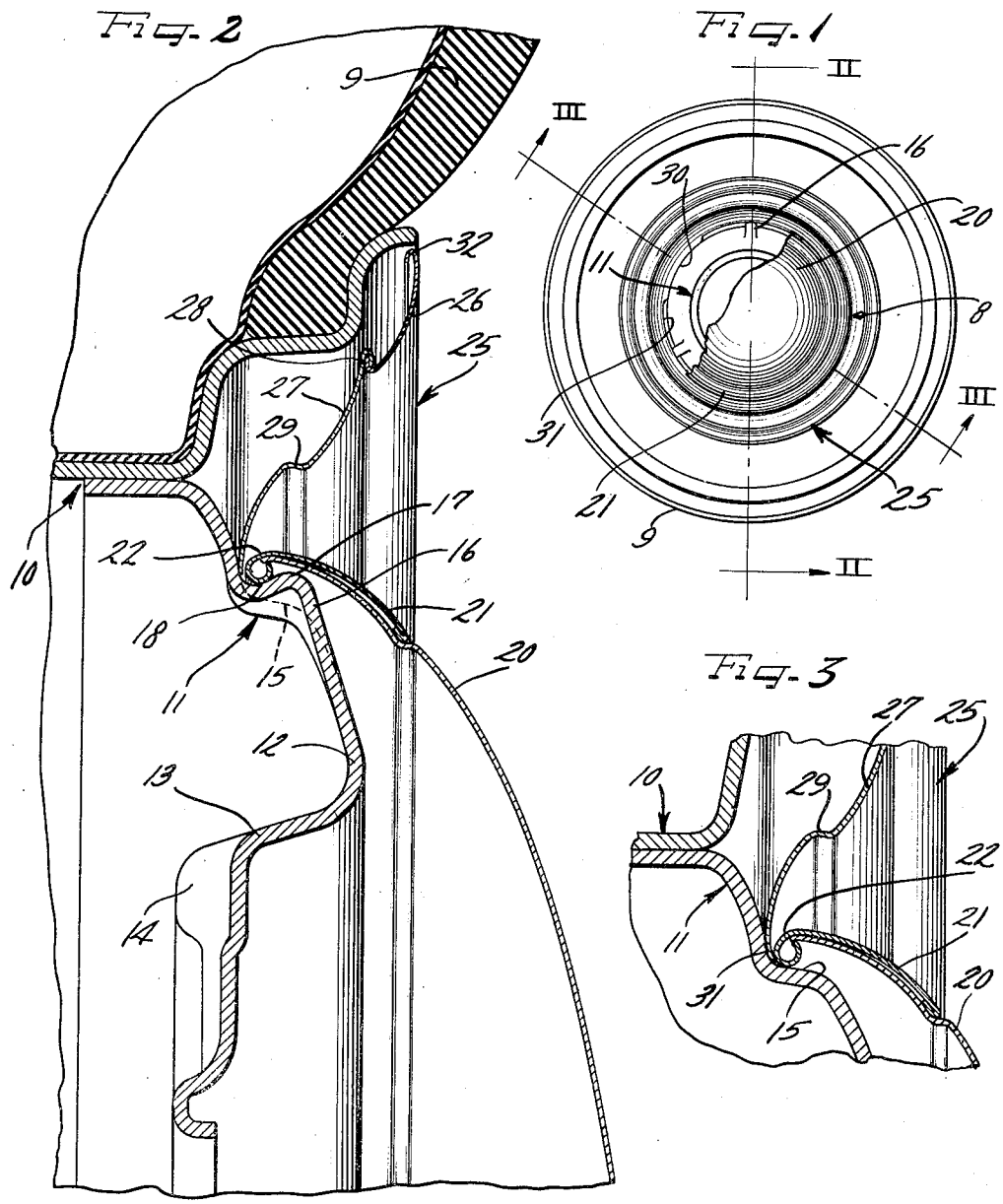

2,544,701

UNITED STATES PATENT OFFICE 2,544,701

WHEEL COVER

George Albert Lyon, Allenhurst, N. J.

Application April 1, 1946, Serial No. 658,713

7 Claims. (Cl. 301—37)

This invention relates to an automobile wheel cover and more particularly to an annular wheel trim which lends itself to more economical manufacture on a large production basis.

Heretofore when automobile trim rings have been of relatively narrow width, it has been feasible to make them from rolled sections. The advantage of rolling such sections rather than making them by punch press operations lies principally in the fact that in rolling the ring there is substantially no waste of material. As distinguished therefrom when the annular sections are stamped from metal sheet waste occurs at the corners and at the center of the ring.

With the demand for trim rings of deeper sections, it has become necessary to resort to stamping processes in order to fabricate such rings.

I aim, in accordance with the features of this invention, to provide a relatively deep ornamental trim ring which is composed of concentric sections of relatively shallow depth so that these sections can be rolled if it is so desired; or at the least the outermost section can be rolled. I find by making the ring in this manner, it is feasible to reduce materially the amount of material necessary in the manufacture of the ring since the amount of waste is substantially reduced.

An object, therefore, of this invention is to provide a multiple section ring which is economical to manufacture and which, by reason of the way in which the sections are interrelated, has even greater strength and rigidity than is true in a one-piece ring made out of the same thickness of material.

In accordance with the general features of this invention, there is provided in a cover structure for a wheel, including a multi-flanged tire rim and a load bearing body part, an annular cover for disposition over an outerside of the wheel comprising a plurality of concentric radially extending annular sections having adjoining edges secured together by a joint opposite the side flanges of the rim, the radially outermost of said sections extending from an outer edge of the rim radially inwardly over an outer side flange thereof to said joint, and a radially inner section extending from the joint radially and axially inwardly to a point opposite said body part.

Another feature of the invention relates to the reinforcing of the innermost section together with the forming of its inner edge into projection for engaging the body part.

Still another feature of the invention relates to the forming of the joint so that it is concealed by the cover and constitutes an annular concentric reinforcing rib in the cover.

Other objects and features of this invention will more fully appear from the following detailed description taken in connection with the accompanying drawing and which illustrates a single embodiment thereof, and in which Figure 1 is a side view of a wheel assembly having a cover embodying the features of this invention; the central hub cap being partly broken away in order to show the radially inner construction of the cover;

Figure 2 is an enlarged fragmentary cross sectional view taken on substantially the line II—II of Figure 1 looking in the direction indicated by the arrows; and Figure 3 is a cross-sectional view similar to Figure 2, but taken on the line III—III of Figure 1 looking in the direction indicated by the arrows, showing in section one of the projections or tabs on the radially innermost edge of the cover.

As shown on the drawing:

As best shown in Figure 2, a conventional pneumatic tire and tube designated by the reference character 9 is mounted in the usual way upon a multi-flanged drop center type of tire rim 10. This tire rim is carried by a load bearing or body part 11, comprising a metallic stamping. The central portion of the body part is bulged out into a nose at 12 and from the nose, the body part is depressed at 13 and formed into a radially extending bolt-on flange 14. This flange is adapted to be fastened by means of bolts or cap screws (not shown) to a part on an automobile wheel axle.

The intermediate portion of the body part 11 is formed with an annular shoulder 15, from which shoulder spaced protuberances or bumps 16 are depressed. These bumps may be of any suitable number, such, for example, as three to five, although I have in Figure 1 illustrated the body part as being provided with three bumps.

Each bump has a high point 17 at the outer side of an inclined portion 18, the bottom of which is disposed radially outward from the shoulder 15.

The purpose of these bumps is to retain a hub cap 20 on the wheel. This hub cap 20 is provided with an outer annular bead 21 which has an outer rolled edge 22 interlocked with the outer edge of the main body 20 of the hub cap. It should be noted that this structure is not the subject of the present invention but is being covered in my copending patent application, Serial No. 622,488, filed October 15, 1945, now Patent Number 2,459,890 issued January 25, 1949. Also attention is directed to the fact that the bump feature of the wheel for retaining the cap thereon is being covered in my copending application, Serial No. 618,825, filed September 27, 1945, now Patent Number 2,445,330 issued July 20, 1948.

In the application of the hub cap 20 to the body part, its turned edge 22 is sprung over the high point 17 of the bumps and is cammed along the inclined surfaces 18 of the bumps until it is seated firmly against the body part. During the course of the application of the hub cap to the body part, portions of its edge 22 between the bumps are caused to flex inwardly against the shoulder 15 so as to clampingly engage the shoulder. In this manner, the edge 22 of the hub cap assumes a somewhat serpentine shape when it is in gripping engagement with the body part of the wheel. Obviously, the hub cap can be easily pried off of the wheel by means of a screw driver inserted under its turned edge 22.

Now my invention is concerned particularly with the construction of a wheel cover, designated generally by the reference character 25, and which is adapted to have its inner portion clamped to the body part by the turned edge 22 of the hub cap. This cover includes concentric annular sheet metal sections 26 and 27, which are rolled or lock-seamed together at 28. Of these sections, at least the section 26 may be rolled on suitable equipment from strip stock. In reality, the section 26 is of a hollow bead-like cross setional shape and has an outer turned edge 32. This edge 32 may or may not contact the outer edge of the rim part 10 as desired. In any event, it is disposed in close proximity to the outer edge of the rim.

The radially inner section 27 is formed of a stepped cross sectional shape, or in other words, is provided with an annular intermediate shoulder 29 for rigidifying and reinforcing the section. The inner margin of this section 27 is notched out at 31 to provide spaced tabs or projections 30, the extremities of which are adapted to contact the shoulder 15 between the bumps 16, as is clearly shown in Figure 1.

The over-all cross-sectional contour of the cover 25 is substantially symmetrically curved so that in use it simulates the side wall of a tire. This appearance can be accentuated if the external surface of the cover 25 is finished in white. In addition the cover may be provided with an opening 8 (Figure 1) through which the usual valve stem from the tire and tube 9 can project.

In the application of the cover, the cover is first placed over the side of the wheel with the aperture 8 opposite the valve stem. Then it is pushed axially rearward until its tabs or projections 30 strike the annular shoulder 15. Thereafter, the hub cap 20 is cammed over the bumps 16 into retaining engagement with the bumps and with the inner tabs of the cover.

Attention is directed to the fact that the notched out sections 31 are sufficiently deep that the cover can clear the bumps 16—16 without engaging any portion of the bumps.

As shown only the tabs or projections 30 of the cover contact the body part. Of course, if it is so desired the outer edge 32 of the cover can contact the edge of the tire rim part 10 so that the cover could bear at two points on the wheel. The tabs 30, in such a mounting of the cover, could yield slightly in accommodating any allowable manufacturing variations in the rim and body parts.

In addition the hole 8 (Fig. 1) in the cover can be dispensed with if a valve stem (not shown) is used of such length that it need not project through the cover. In that event it would be necessary to remove the hub cap and cover in order to obtain access to the valve stem.

I claim as my invention:

1. In a cover for the outer side of a vehicle wheel including a body portion having a generally radially outwardly facing shoulder, a cover annulus comprising two annular cover members joined together, the inner of the cover members having a plurality of generally radially inwardly extending tabs on its inner edge engageable with said shoulder, the spacing between tabs being of such width that the tabs comprise but a small proportion of the inner margin of the cover annulus.

2. In a cover for the outer side of a vehicle wheel including a body portion having a generally radially outwardly facing shoulder, a cover annulus comprising two annular cover members joined together, the inner of the cover members having a plurality of generally radially inwardly extending tabs on its inner edge engageable with said shoulder, the outer of said cover members having a convex cross section and the inner of said cover members having the radially outer portion thereof convexly cross sectioned and the radially inner portion thereof concavely cross sectioned, the concave and convex portions of the inner cover member being joined by an angularly disposed reinforcing portion.

3. A cover for use on the outer side of a vehicle wheel, said cover comprising a pair of annular members of cooperatively related widths and formation, one of said members being of larger diameter than the other of said members, said larger diameter member forming the outer portion of the cover annulus and the other member forming the inner portion of the cover annulus, the inner margin of the outer cover member and the outer margin of the inner cover member being permanently secured together, the inner cover member having an intermediate annular angular portion affording reinforcement therefor and extending toward the axially inner side of the cover, said angular portion dividing the inner member into a pair of annular portions one of which is of concave cross section and the other of which is of convex cross section.

4. In a wheel structure comprising a tire rim and a load sustaining body portion including an annular generally outwardly protruding nose portion having a radially outwardly facing shoulder including a plurality of cover retaining bumps projecting radially from the surface thereof, an annular cover member substantially concealing the tire rim and having a plurality of tabs engaging edgewise against said shoulder intermediate said bumps and intermediate said tabs clearing said bumps, and a hub cap retainingly engaging said bumps and being substantially out of engagement with said annular cover member adjacent said bumps but being stressed toward said tabs intermediate said bumps.

5. In a wheel structure including a tire rim and a load sustaining body portion and having a generally outwardly projecting annular nose bulge formed with a generally radially outwardly facing annular shoulder including a series of radially outwardly protruding cover retaining bumps, a cover annulus for substantially concealing the tire rim and having an inner margin provided with a series of generally radially inwardly extending retaining tabs engaging edgewise against said shoulder and clearing said bumps intermediate said tabs, the inner faces of the tab terminals engaging against the wheel body radially outwardly adjacent the base of the shoulder.

6. In a wheel structure including a tire rim and a load sustaining body portion and having a generally outwardly projecting annular nose bulge formed with a generally radially outwardly facing annular shoulder including a series of radially outwardly protruding cover retaining bumps, a cover annulus for substantially concealing the tire rim and having an inner margin provided with a series of generally radially inwardly extending retaining tabs engaging edgewise against said shoulder and clearing said bumps intermediate said tabs, the inner faces of the tab terminals engaging against the wheel body radially outwardly adjacent the base of the shoulder, the engagement of the tabs being the sole engagement of the cover annulus with the wheel structure and the outer margin of the cover annulus extending adjacent to but spaced from the outer extremity of the tire rim.

7. In a wheel structure including a tire rim and a load sustaining body portion and having a generally outwardly projecting annular nose bulge formed with a generally radially outwardly facing annular shoulder including a series of radially outwardly protruding cover retaining bumps, a cover annulus for substantially concealing the tire rim and having an inner margin provided with a series of generally radially inwardly extending retaining tabs engaging edgewise against said shoulder and clearing said bumps intermediate said tabs, the inner faces of the tab terminals engaging against the wheel body radially outwardly adjacent the base of the shoulder, the engagement of the tabs being the sole engagement of the cover annulus with the wheel structure and the outer margin of the cover annulus extending adjacent to but spaced from the outer extremity of the tire rim, the body of the cover annulus comprising a series of annular sections of curved cross section having substantially rigid respective juncture to rigidify the annulus so that it will extend firmly from the inner marginal tab engagement with the wheel body.

GEORGE ALBERT LYON.

REFERENCES CITED

The following references are of record in the file of this patent:

UNITED STATES PATENTS

| Number | Name | Date |
| --- | --- | --- |
| Re. 21,179 | Lyon | Aug. 22, 1939 |
| 2,263,243 | Lyon | Nov. 18, 1941 |
| 2,308,615 | Lyon | Jan. 19, 1943 |
| D. 141,497 | Lyon | June 5, 1945 |
| 2,368,232 | Aske | Jan. 30, 1945 |